United States Patent
Iwashita et al.

(10) Patent No.: US 6,879,130 B2
(45) Date of Patent: Apr. 12, 2005

(54) CONTROLLER FOR INDUCTION MOTOR

(75) Inventors: Yasusuke Iwashita, Yamanashi (JP);
Takahiro Akiyama, Yamanashi (JP);
Junichi Tezuka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/715,857

(22) Filed: Nov. 19, 2003

(65) Prior Publication Data

US 2004/0135539 A1 Jul. 15, 2004

(30) Foreign Application Priority Data

Nov. 20, 2002 (JP) ........................................ 2002-336596

(51) Int. Cl.[7] .............................................. H02P 3/36
(52) U.S. Cl. ..................... 318/807; 318/727; 318/803; 318/811; 318/813
(58) Field of Search ................................ 318/727, 803, 318/807, 811, 813

(56) References Cited

U.S. PATENT DOCUMENTS

| | | | | |
|---|---|---|---|---|
| 4,441,065 A | * | 4/1984 | Bayer et al. ................. | 318/808 |
| 4,450,398 A | | 5/1984 | Bose .......................... | 318/803 |
| 4,567,419 A | * | 1/1986 | Watanabe .................... | 318/798 |
| 4,672,288 A | * | 6/1987 | Abbondanti ................. | 318/803 |
| 4,926,105 A | * | 5/1990 | Mischenko et al. .......... | 318/800 |
| 5,294,876 A | | 3/1994 | Jonsson ....................... | 318/803 |
| 5,476,158 A | * | 12/1995 | Mann et al. ................. | 187/289 |
| 6,075,337 A | * | 6/2000 | Ishii et al. .................... | 318/801 |

FOREIGN PATENT DOCUMENTS

| | | |
|---|---|---|
| JP | 1-174286 | 7/1989 |
| JP | 2-211087 | 8/1990 |
| JP | 7-067400 | 3/1995 |
| JP | 10-023799 | 1/1998 |

OTHER PUBLICATIONS

Patent Abstracts of Japan of JP 01174286 dated Jul. 10, 1989.

Patent Abstracts of Japan of JP 07067400 dated Mar. 10, 1995.

Patent Abstracts of Japan of JP 01023799 dated Jan. 26, 1989.

* cited by examiner

*Primary Examiner*—Rita Leykin
(74) *Attorney, Agent, or Firm*—Staas & Halsey LLP

(57) ABSTRACT

A controller for a vector control of an induction motor, which is capable of easily determining a rotor resistance for use in calculation of a slip frequency. A temperature sensor is provided for detecting a temperature of a stator. Information on relation between the rotor temperature and the rotor resistance predetermined based on measurement is stored in a table. In driving the induction motor, the rotor resistance for the stator temperature detected by the temperature sensor is read from the table. A torque command $I_2$ is divided by a magnetic flux command $\Phi_2$ and the obtained quotient is multiplied by the read value of the rotor resistance to obtain the slip frequency $\omega s$, so that the vector control is performed based on the obtained slip frequency $\omega s$. The value of the rotor resistance is easily determined by simply referring the table without complicated calculation. Since the stored information on the rotor resistance are based on measured values, a more precise value of the slip frequency is obtained to realize a precise vector control of the induction motor.

1 Claim, 2 Drawing Sheets

CONTROLLER FOR INDUCTION MOTOR

BACKGROUND OF THE INVENTION

1. Field of the Invention

The present invention relates to a controller for performing a vector control of an induction motor.

2. Description of Related Art

There is known a method of performing a vector control of an induction motor using a rotor resistance of the induction motor. However, it is necessary to perform temperature compensation on the rotor resistance since the rotor resistance varies with the temperature. It is difficult to directly detect an actual rotor resistance or the rotor temperature in operating the motor. Thus, in order to determine the rotor resistance, there has been proposed a method of estimating the rotor temperature based on a present value or historical values of a torque current of the motor and a predetermined thermal constant such as a thermal time constant, so that the rotor resistance is determined based on the estimated rotor temperature (e.g. JP 7-67400A).

Further, there has been proposed a method of determining the rotor temperature based on a detected stator temperature, a heat conduction amount estimated using heat conduction models of the stator and the rotor, and a heat loss of the rotor, so that the rotor resistance is determined based on the rotor temperature (e.g. JP 10-23799A). Further, there is known a method of calculating the rotor temperature based on detected temperatures of the stator and ambience thereof to compensate a slip frequency based on the calculated rotor temperature (e.g. JP 1-174286A).

Moreover, there is known a method of determining a temperature compensation amount based on a detected stator temperature and a reference temperature thereof, and calculating the rotor resistance after temperature compensation based on the determined temperature compensation amount and a rotor resistance at the reference temperature, so that the slip frequency is obtained based on the calculated rotor resistance (e.g. JP 2707680B).

In the above conventional vector control of the induction motor, the rotor resistance is obtained by calculation using estimated values or models. Thus, the processing for obtaining the slip frequency is complicated since the rotor resistance is obtained by the calculation.

SUMMARY OF THE INVENTION

The present invention provides a controller for vector controlling a induction motor capable of determining a rotor resistance easily to obtain a slip frequency.

A controller of an induction motor of the present invention comprises: a temperature sensor for detecting a stator temperature; a table storing relation between the stator temperature and the rotor resistance measured in advance; and a processor to obtain a value of the rotor resistance for the stator temperature detected by the temperature sensor referring to the table, and determine a slip frequency based on the obtained value of the rotor resistance for use in the vector control.

DETAILED DESCRIPTION

Figure 1:
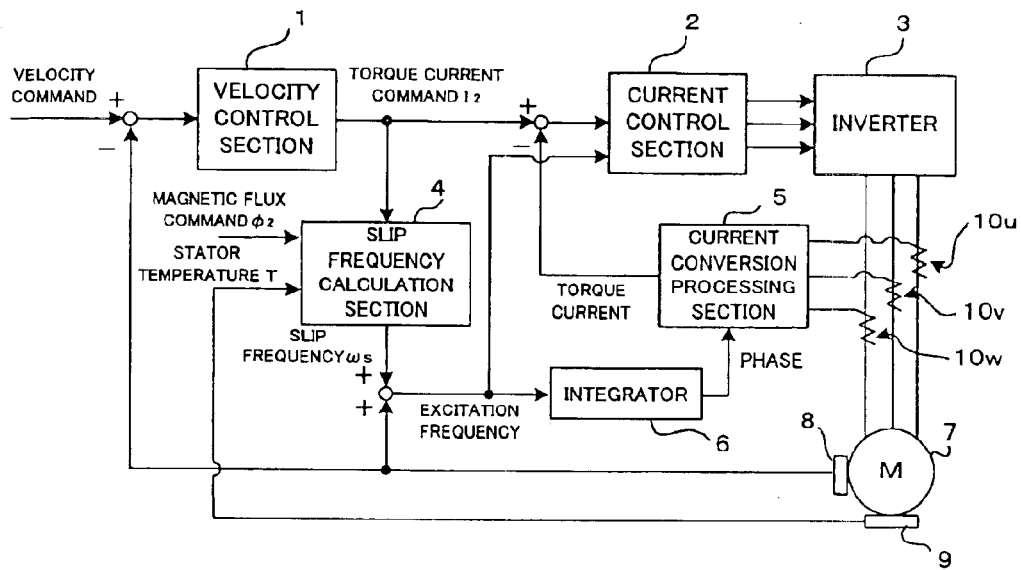
FIG. 1 is a block diagram of a controller for vector controlling an induction motor according to an embodiment of the present invention.

As shown in FIG. 1, a velocity of an induction motor 7 detected by a velocity detector 8 provided at the induction motor 7 is subtracted from a velocity command issued from a host numerical controller to obtain a velocity deviation. A velocity control section 1 obtains a torque command (rotor current command) $I_2$ by performing PI (proportional plus integral) control. A slip frequency calculating section 4 receives the torque command $I_2$, a magnetic flux (rotor magnetic flux) command $\Phi_2$ determined in accordance with a rotational velocity of the motor 7, and a temperature T detected by a temperature sensor 9 provided at a stator of the motor 7 and performs the processing as described later to obtain a slip frequency ωs. The velocity of the motor is added to the slip frequency ωs to obtain an excitation frequency and the obtained excitation frequency is outputted to a current control section 2.

The excitation frequency is integrated by an integrator 6 to obtain a phase. The current conversion processing section 5 performs a d-q conversion based on driving currents of three phases detected by current detectors 10u, 10v, 10w, respectively, and the phase obtained by the integrator 6, to obtain a torque current of a q-phase.

The torque current obtained by the current conversion processing section 5 is subtracted from the torque current command $I_2$ outputted from the velocity control section 1 to obtain a current deviation to be inputted to the current control section 2. The current control section 2 performs a vector control based on the inputted current deviation, the excitation frequency and the excitation current command (not shown), to obtain a voltage command and converts the obtained voltage command into three-phase voltages to be outputted to an inverter 3 so as to drivingly control the induction motor 7.

The above hardware configuration of the controller is easily achieved by providing a general controller for performing a vector control of an induction motor with the temperature sensor 9 for detecting the rotor temperature of the induction motor 7 so that an output thereof is inputted to the slip frequency calculation section 4.

Figure 2:
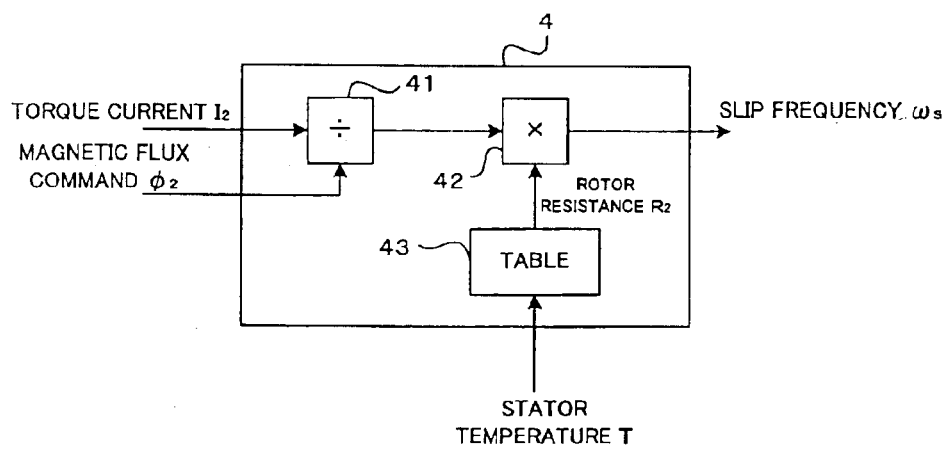
FIG. 2 is a detailed block diagram of a slip computation section in the controller as shown in FIG. 1.

A detailed block diagram of the slip frequency calculation section 4 is shown in FIG. 2. The slip frequency calculation section 4 comprises a divider 41, a multiplier 42 and a table 43 storing information on values of the rotor resistance for the stator temperature. The torque current command (rotor current command) $I_2$ is divided by a commanded magnetic flux $\Phi_2$ and the obtained quotient is multiplied by the value of the rotor resistance $R_2$ read from the table 43 for the present stator temperature T at the multiplier 42, to output the slip frequency ωs. Thus, the calculation according to the following equation (1) is performed to obtain the slip frequency ωs.

$$\omega s = (I_2/\Phi_2) \times R_2 \qquad (1)$$

Figure 3:
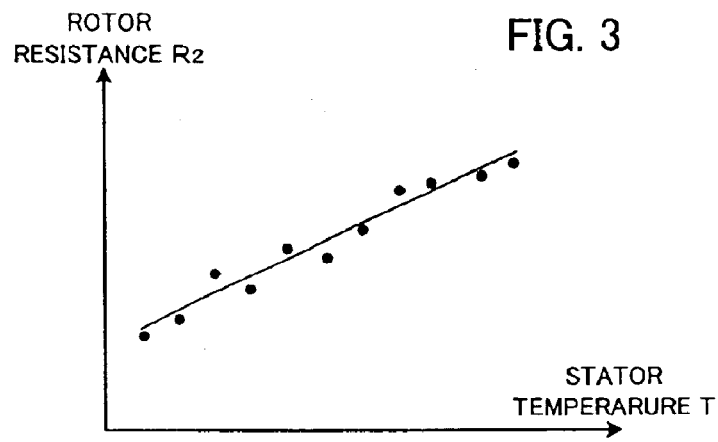
FIG. 3 is a graph of measured values of the rotor resistance with respect to a stator temperature to be stored in a table.

The table 43 stores values of the rotor resistance value $R_2$ for the stator temperature T detected by the temperature sensor 9 based on measurements in performing operations of the induction motor 7. FIG. 3 is a graph showing relation between the stator temperature T and the rotor resistance $R_2$ based on the measurements, and information on values of the rotor resistance $R_2$ with respect to the stator temperature T are stored in the table 43.

Since a value of the rotor resistance $R_2$ for the present stator temperature T detected by the temperature sensor 9 is read from the table 43, the value of the rotor resistance $R_2$ is easily obtained to determine the slip frequency ω s.

Figure 4:
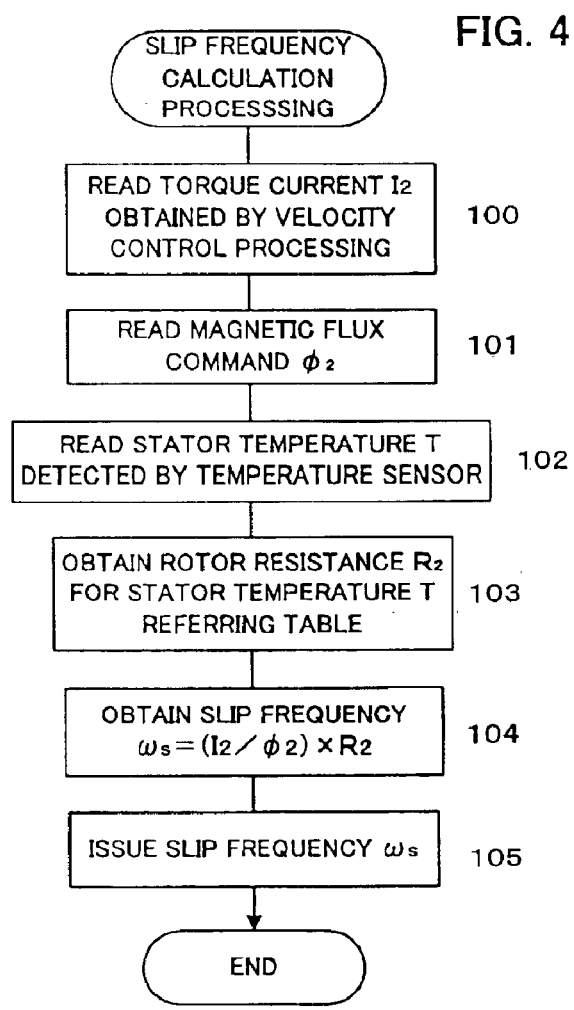
FIG. 4 is a flowchart of processing of computation of a slip frequency to be performed by a processor of the controller.

The above processing can be performed by a dedicated circuitry but is preferably performed by a processor of the controller as software processing. The processing for calculating the slip frequency to be performed by the processor in the controller is shown in FIG. 4.

First, the torque current 12 obtained by the velocity control processing is read (Step 100), and the magnetic flux command $\Phi_2$ is read (Step 101). The stator temperature T detected by the temperature sensor 9 is read (Step 102) and the value of the rotor resistance $R_2$ for the read stator temperature T is read from the table 43 (Step 103). The calculation according to the equation (1) using the torque current $I_2$, the magnetic flux command $\Phi_2$, and the rotor resistance $R_2$ is performed to obtain the slip frequency (Step 104) and the obtained slip frequency is issued for other processing, to terminate the procedure.

According to the present invention, the rotor resistance is easily obtained based on the detected stator temperature so that the slip frequency is easily and quickly determined. Since the values of the rotor resistance are predetermined based on actual measurements, the slip frequency is precisely determined to enable a precise vector control of the induction motor.

What is claimed is:

1. A controller for performing a vector control of an induction motor having a stator and a rotor using a rotor resistance, comprising:

a temperature sensor for detecting a stator temperature;

a table storing information on relation between the stator temperature and the rotor resistance predetermined based on measurement; and a processor to obtain a value of the rotor resistance for the stator temperature detected by said temperature sensor referring said table, and to calculate a slip frequency for the vector control based on the obtained value of the rotor resistance.

* * * * *

UNITED STATES PATENT AND TRADEMARK OFFICE
CERTIFICATE OF CORRECTION

PATENT NO. : 6,879,130 B2
DATED : April 12, 2005
INVENTOR(S) : Yasusuke Iwashita et al.

It is certified that error appears in the above-identified patent and that said Letters Patent is hereby corrected as shown below:

Title page,
Item [73], Assignee, change "Fanuc Ltd" to -- FANUC LTD --;

Column 3,
Line 14, change "12" to -- $1_2$ --.

Signed and Sealed this

Tenth Day of January, 2006

JON W. DUDAS
*Director of the United States Patent and Trademark Office*